United States Patent
Liskey et al.

(12)

(10) Patent No.: US 6,857,492 B1
(45) Date of Patent: Feb. 22, 2005

(54) AIRFLOW DRIVEN ELECTRICAL GENERATOR FOR A MOVING VEHICLE

(76) Inventors: Kenneth W. Liskey, 1303 W. King Rd., Malvern, PA (US) 19355; Eugene B. Liskey, 3 Fox Run La., Newtown Square, PA (US) 19073

(*) Notice: Subject to any disclaimer, the term of this patent is extended or adjusted under 35 U.S.C. 154(b) by 0 days.

(21) Appl. No.: 10/339,484

(22) Filed: Jan. 9, 2003

(51) Int. Cl.$^7$ ............................................. B62M 1/10
(52) U.S. Cl. ..................... 180/165; 180/2.2; 180/65.3; 290/44
(58) Field of Search ............................... 180/165, 2.2, 180/65.2, 65.3; 290/44, 42, 53, 54, 55, 38 R

(56) References Cited

U.S. PATENT DOCUMENTS

| | | | | |
|---|---|---|---|---|
| 3,513,326 A | * | 5/1970 | Potts .......................... | 290/55 |
| 3,556,239 A | * | 1/1971 | Spahn ........................ | 180/65.2 |
| 3,621,930 A | | 11/1971 | Dutchak ..................... | 180/65 R |
| 3,740,564 A | * | 6/1973 | Wong ......................... | 290/38 R |
| 3,878,913 A | * | 4/1975 | Lionts et al. ................ | 180/2.2 |
| 4,141,425 A | | 2/1979 | Treat ......................... | 180/65 DD |
| 4,168,759 A | | 9/1979 | Hull et al. .................. | 180/65 DD |
| 4,254,843 A | | 3/1981 | Han et al. .................... | 180/165 |
| 4,418,287 A | | 11/1983 | Syverson ..................... | 290/44 |
| 4,423,368 A | | 12/1983 | Bussiere ...................... | 322/35 |
| 5,280,827 A | | 1/1994 | Taylor et al. ................ | 180/165 |
| 5,287,004 A | * | 2/1994 | Finley ........................ | 290/55 |
| 5,386,146 A | * | 1/1995 | Hickey ....................... | 290/55 |
| 5,584,355 A | | 12/1996 | Burns ......................... | 180/165 |
| 5,606,233 A | * | 2/1997 | Davis ......................... | 180/65.3 |
| 5,680,032 A | | 10/1997 | Pena ........................... | 320/61 |
| 5,760,515 A | * | 6/1998 | Burns ......................... | 290/55 |
| 5,986,429 A | | 11/1999 | Mula, Jr. ..................... | 320/101 |
| 6,138,781 A | | 10/2000 | Hakala ........................ | 180/2.2 |
| 6,373,145 B1 | * | 4/2002 | Hamrick ...................... | 290/44 |
| 6,700,215 B2 | * | 3/2004 | Wu ............................ | 290/44 |
| 6,740,988 B2 | * | 5/2004 | Tseng ......................... | 290/44 |

* cited by examiner

*Primary Examiner*—Hau Phan
(74) *Attorney, Agent, or Firm*—Michael F. Petock, Esq.

(57) ABSTRACT

An apparatus for generating electricity in a moving vehicle utilizes a low drag spirally shaped fin mounted longitudinally on a cylindrical component of a generator which receives air from a vent as the vehicle moves through air. The vent includes structure for bypassing at least a portion of the airflow through the vent as the vehicle moves faster through the air. The airflow causes the cylindrical member to rotate causing the generator to generate electricity. The rotating cylindrical member may be provided with magnetic material.

63 Claims, 8 Drawing Sheets

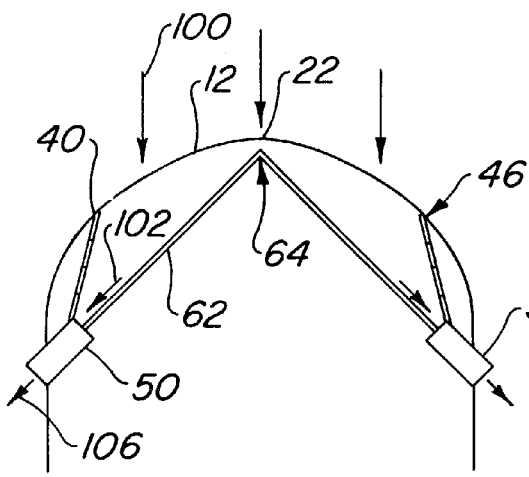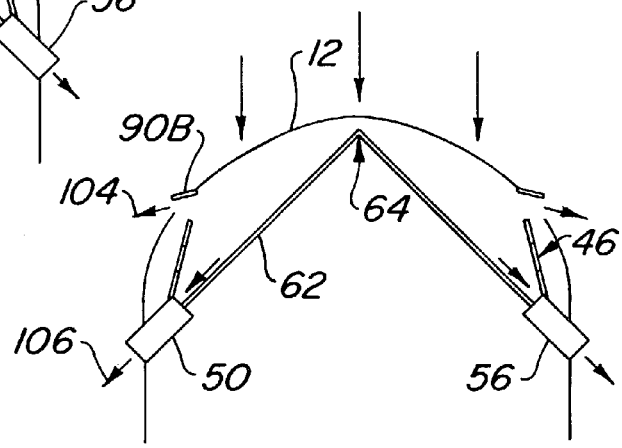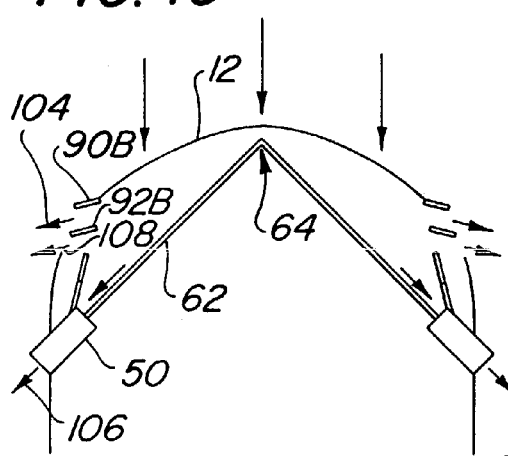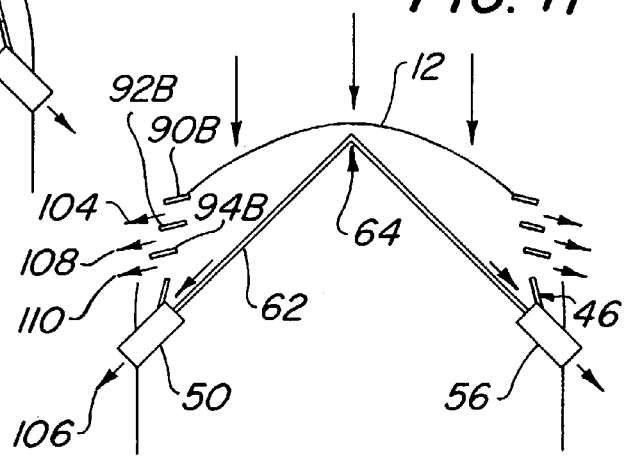

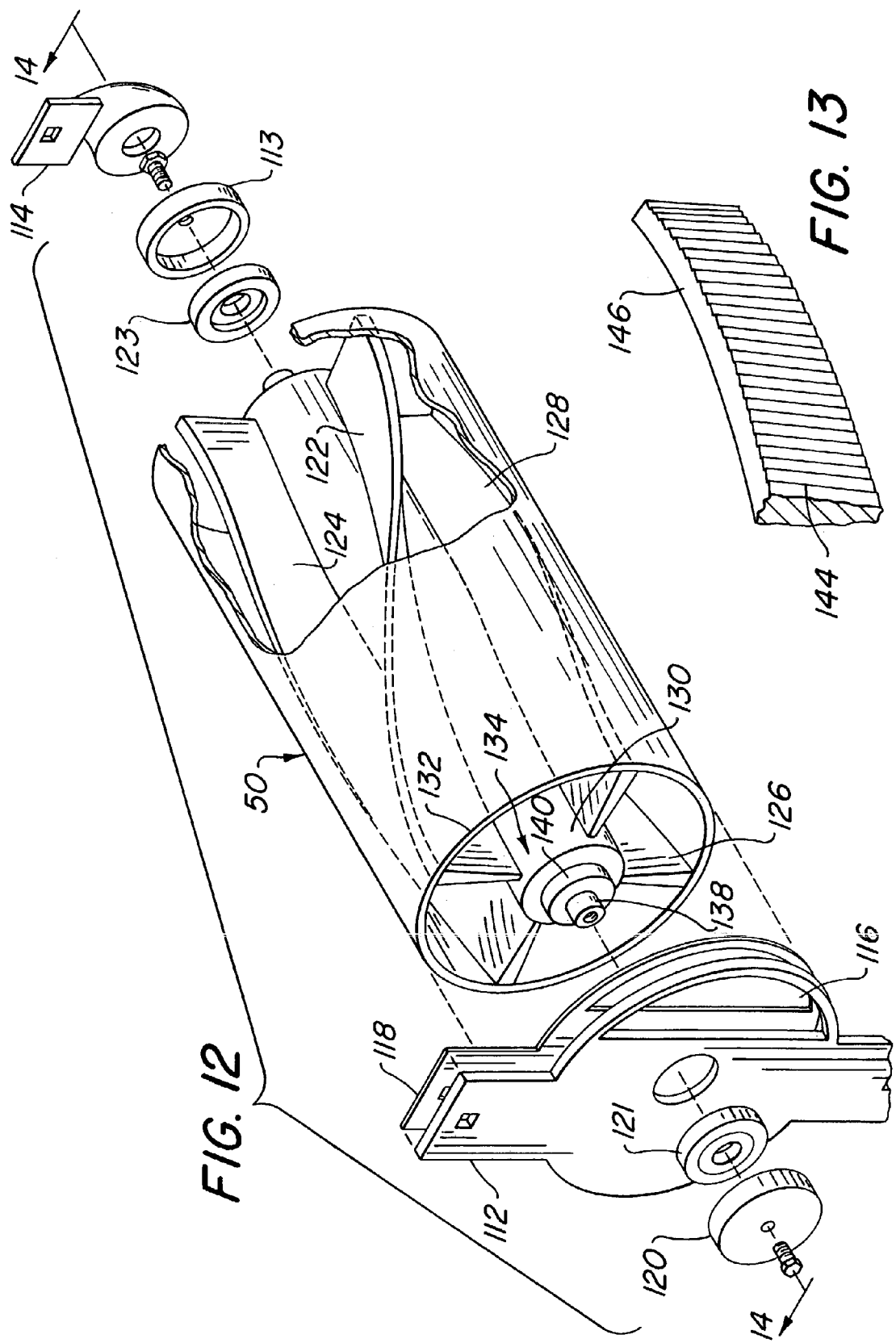

US 6,857,492 B1

AIRFLOW DRIVEN ELECTRICAL GENERATOR FOR A MOVING VEHICLE

FIELD OF THE INVENTION

The present invention relates to an airflow driven electrical generator for a moving vehicle. More particularly, the present invention relates to an airflow driven electrical generator for a moving vehicle which provides increased efficiency and reduced drag.

BACKGROUND OF THE INVENTION

Efficient and cost effective transportation by a vehicle, whether by motor vehicle, train, airplane or boat, has become very important. Conserving energy and achieving the maximum benefit from the energy available is very important in achieving these goals. There has been some significant effort in recent years to produce an effective electrically powered automotive vehicle. There is a desire for such electric vehicles to be efficient and to maximize the possible trip milage available before recharging of batteries and the like.

There has been a desire to be able to produce electrical energy for use in a vehicle and for storage of energy for future use in the vehicle. One effort has used propellers in an air tunnel with a Venturi as disclosed in U.S. Pat. No. 3,621,930—Dutchak. However, such propellers generate significant drag, and particularly at higher speeds, the drag can use more energy than is gained by the electrical generation system. A more recent effort is an electrically powered vehicle as disclosed in U.S. Pat. No. 4,254,843—Han et al., which again uses a fan to rotate an alternator to produce electricity to charge batteries. Hakala, even more recently, discloses in U.S. Pat. No. 6,138,781, a multi-stage impeller system which includes high-speed impellers and low-speed impellers for driving an electric generator/alternator for generating electricity in an electric vehicle. Although Hakala uses two different impeller blades, he still uses impeller blades which produce significant drag.

SUMMARY OF THE INVENTION

The present invention provides various advantages over what has been done in the past including the providing of a high efficiency, low drag system which may be utilized on vehicles travelling at all speeds, from low speeds to high speeds.

Briefly and basically, in accordance with the present invention, an apparatus is provided for generating electricity in a moving vehicle. Mounted within the vehicle is a generator for generating electricity. The generator includes a cylindrical component adapted to rotate. The cylindrical component includes at least one spirally shaped fin mounted longitudinally on the cylindrical component. A vent is provided for directing airflow in the direction of the spiral fin as a result of movement of the vehicle through air. The vent includes structure for bypassing at least a portion of the airflow through the vent as the vehicle moves faster through the air. The airflow causes the cylindrical member to rotate causing the generator to generate electricity.

In a presently preferred embodiment, there would be a plurality of fins and in one presently preferred embodiment, there would be four fins. However, the number of fins may vary depending on the application. These fins would be mounted on the cylindrical component which is mounted around a stationary armature. The cylindrical component contains magnetic material which creates a varying magnetic field as the cylindrical component is caused in rotate by means of airflow impinging upon the spiral fins. The venting system may be provided with one or more shutters which are controlled as a function of the speed of the vehicle and airflow through the chamber containing the spiral fins.

The fins may make a complete revolution about the cylindrical component or may be mounted such that they go around any portion of a rotation or greater than a rotation. However, in a presently preferred embodiment for high torque (or a low rate of airflow) applications, the fins make one complete revolution about the cylindrical component. In another presently preferred embodiment for high rates of airflow through the chamber, the fins would make less than a complete revolution about the cylindrical component.

The cylindrical component may be comprised of fins mounted between an inner and an outer cylindrical member or element as a rigid unit or the fins may be mounted on an inner cylindrical member or element to rotate freely within an outer cylindrical member. In a presently preferred embodiment, the fins would be mounted between the inner and outer cylindrical members to rotate as a unit.

The present invention may be used on any type of a moving vehicle that moves through air. This may include all types of motor vehicles including automobiles, buses and trucks, trains, planes and watercraft such as ships and boats. Any other type of vehicle that moves through air may also benefit by use of the present invention.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 8 is a plan view at least partially in cross section illustrating the vent structure in the fully closed position.

FIG. 9 is a plan view of the vent structure illustrating one bypass structure in each vent being opened.

FIG. 10 is a plan view of the vent structure illustrating two bypass structures in each vent being opened.

FIG. 11 is a plan view of the vent structure illustrating three bypass structures in each vent being opened.

FIG. 12 is a view in perspective, partially broken away, to illustrate one embodiment of an air driven generator structure.

FIG. 13 is a partially broken away view in perspective of a section of a spiral fin having undulations on the surface thereof.

DETAILED DESCRIPTION OF THE PREFERRED EMBODIMENTS

Figure 1:
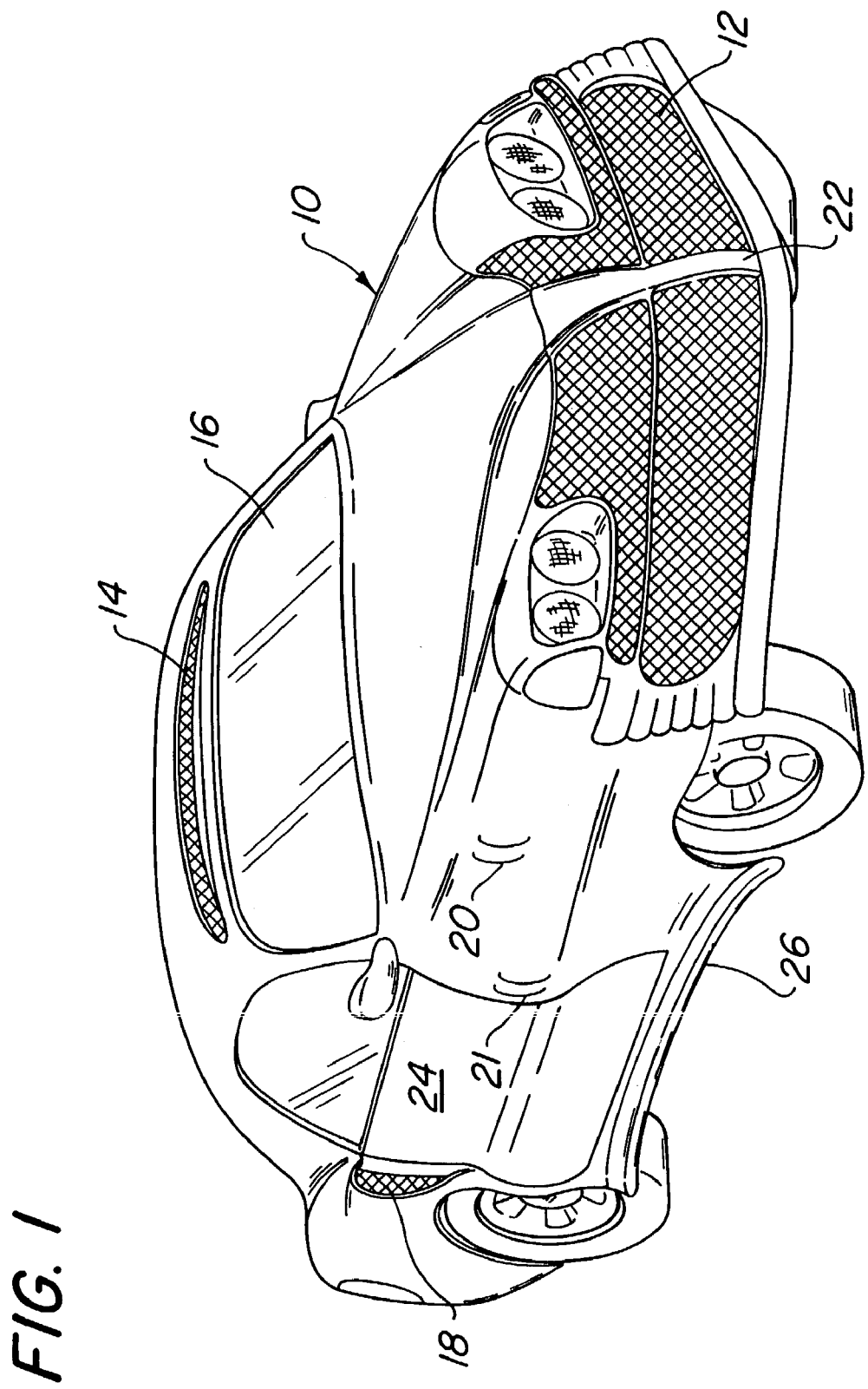
FIG. 1 is a view in perspective of a motor vehicle incorporating the present invention.

Referring now to the drawings in detail, wherein like numerals indicate like elements, there is shown in FIG. 1 a motor vehicle 10 in the form of an automobile. Motor vehicle 10 may be provided with a front grill 12 for the collection of air as the vehicle move forward through the atmosphere. Grill 12, as well as other grills on the vehicle, may be provided with or act as a filter to prevent particles, such as road debris, bugs and the like, from entering the airflow system of the vehicle. Further, particularly where a vehicle may be operated in cold wet conditions, grill 12 and the other grills utilized on the intakes at collection sites may be provided with heaters to prevent icing from occurring in the airflow channels such as the vents and airflow passages of the generator. Additional collection sites may be formed on the vehicle. As illustrated in FIG. 1, collection site 14 may be provided in the roof area above the windshield. The motor vehicle 10 may be aerodynamically designed including a slanted low air resistance windshield 16. An additional air collection site 18 may be provided on each side of the vehicle. The air collection sites may be mounted in other locations adapted to capture airflow as the vehicle moves forward through air. The collection sites may be located anywhere on the leading surface of the vehicle's movement, for example, if the vehicle were operated extensively in reverse, then the air collection sites would be located on the rear of the vehicle. However, the customary use of the vehicle is primarily for moving forward and accordingly the collection sites would be located on a front or leading surface of the vehicle for maximum collection and harnessing of the energy of the airflow.

In accordance with the present invention, one of the objectives is to produce a vehicle which produces electrical energy as a result of movement of the vehicle through the atmosphere or through air with a minimum of drag as a result of capturing the energy resulting from the airflow. Accordingly, exhaust ducts would be located rearward, rather than making a sharp turn or angle to the side, such as a 90 degree angle to exit immediately. As illustrated in FIG. 1, exhaust vents 20 and 21 are provided on the side of the vehicle rearward and/or above of the front wheel well. The front wheel well may be moved forward in a preferred embodiment to provide additional space for the exhaust vents.

As illustrated in FIG. 1, motor vehicle 10 is aerodynamically designed and may have a somewhat V-shaped front, for example, with the apex of the V being at 22. The side of vehicle may be provided with a depressed area or an air scoop area 24 to maximize air collection for side collection vent 18. Further, the side of the vehicle may be provided with air dams 26 to minimize the airflow being channeled under the vehicle, which may result in turbulence and loss of efficiency.

Figure 2:
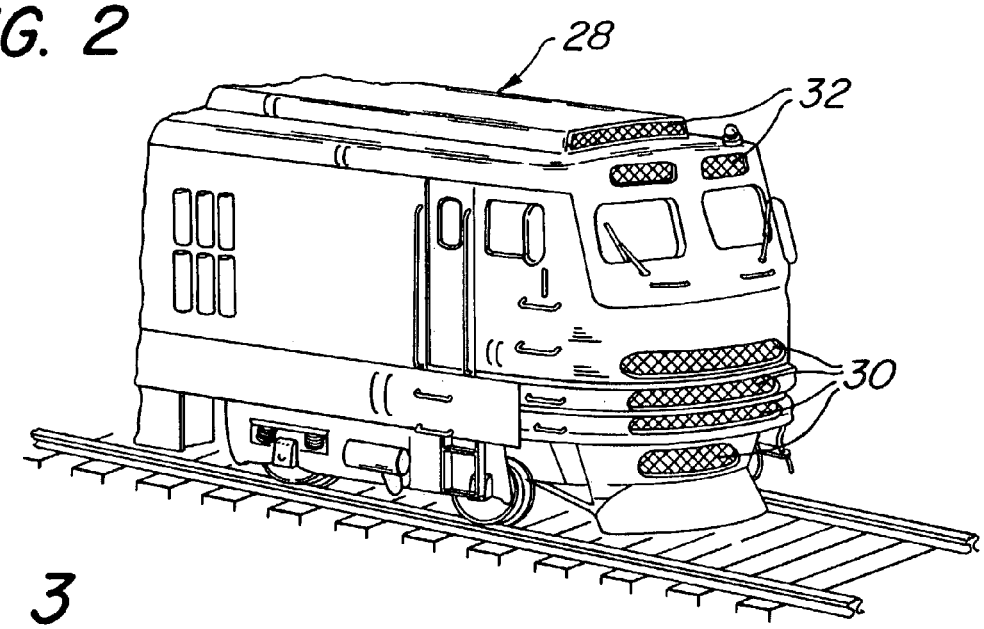
FIG. 2 is a broken away view in perspective of a train incorporating the present invention.

The present invention may be utilized in any vehicle that moves through air. For example, there is shown in FIG. 2 a train 28 having lower intake or collection vents 30 located on the front of the train and upper collection or intake air vent 32 located on the upper front of the train.

Figure 3:
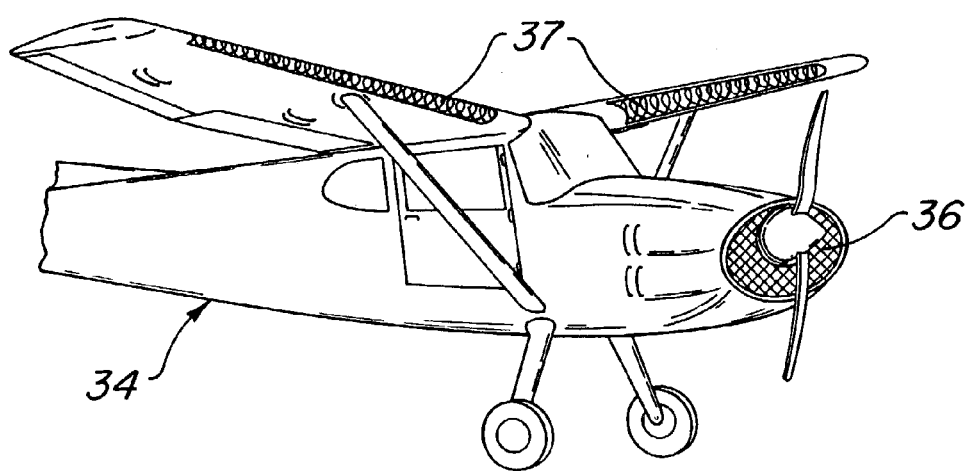
FIG. 3 is a broken away view in perspective of an airplane incorporating the present invention.

FIG. 3 illustrates an airplane 34 with an air intake vent 36 in the nose area and air intake vents 37 on the wings.

Figure 4:
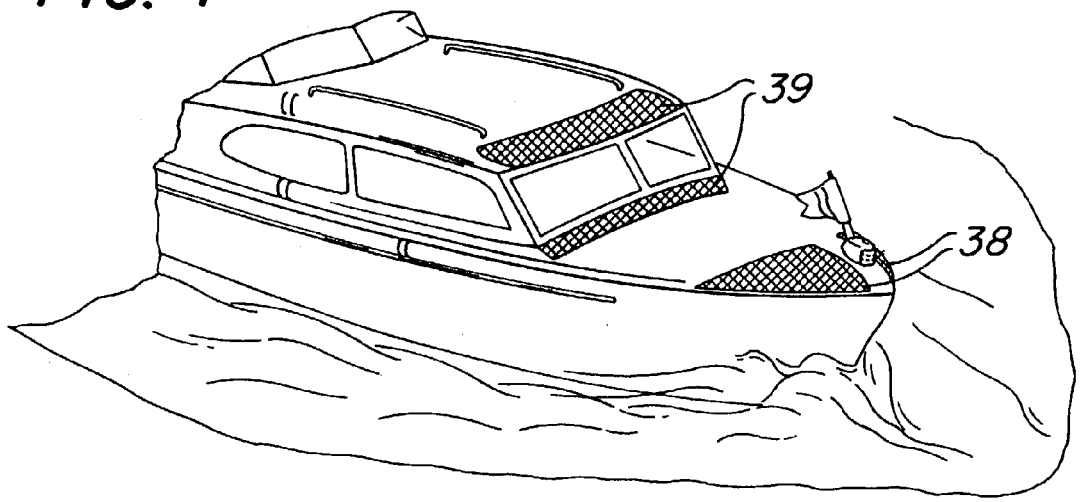
FIG. 4 is a broken away view in perspective of a watercraft such as a boat incorporating the present invention.

FIG. 4 illustrates a boat, ship or other water vehicle which moves through air with air intake vents 38 located forward and vents 39 located mid craft. The train, airplane and boat or ship of FIGS. 2-4 would also be provided with exhaust vents which are not shown.

Figure 5:
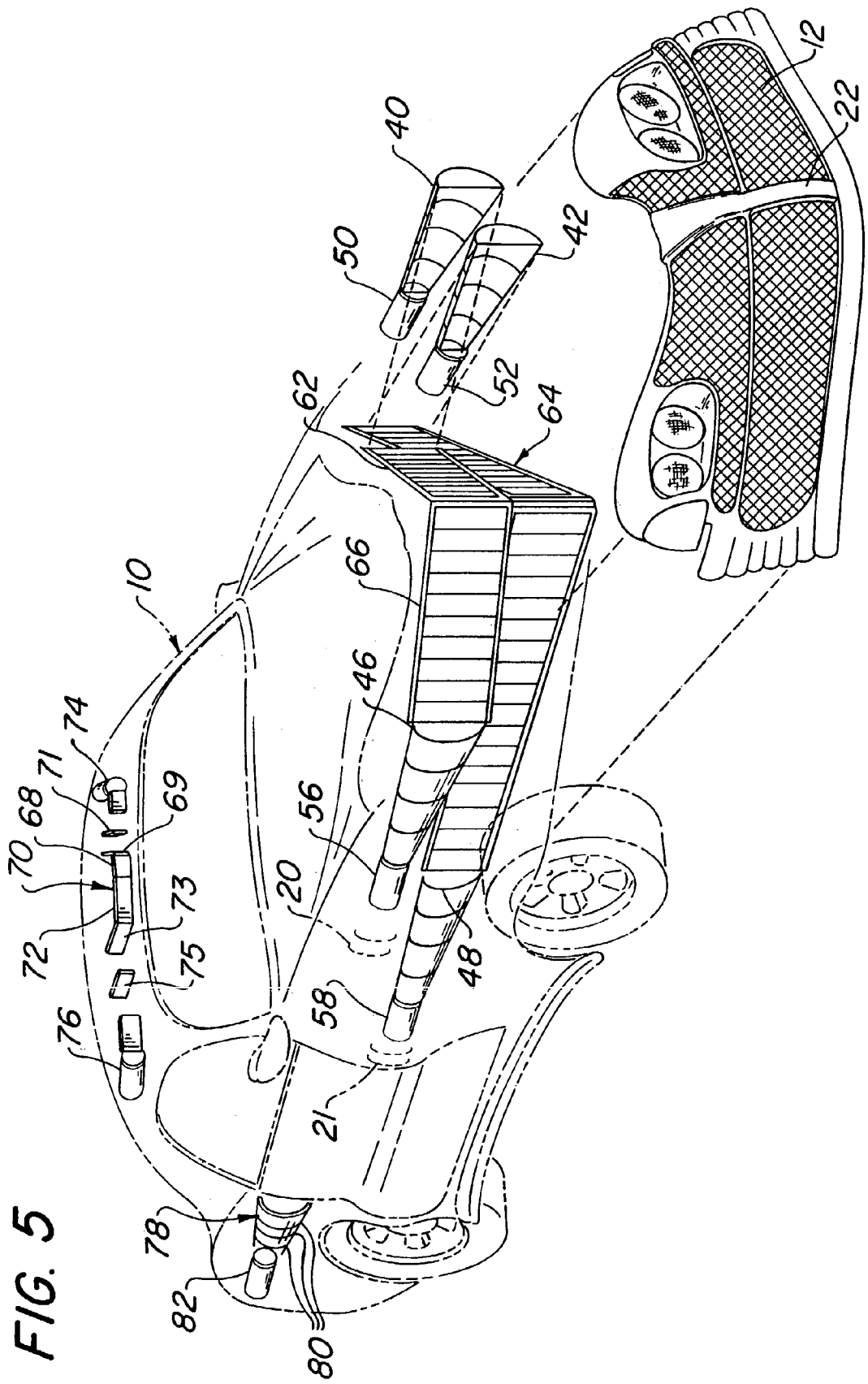
FIG. 5 is a view in perspective of a motor vehicle partially broken away and partially exploded illustrating the structure of the present invention.

Referring now to FIG. 5, there is shown in dotted outline the motor vehicle 10 previously illustrated in FIG. 1. FIG. 5 illustrates the front grill 12 removed or exploded forward to expose the structure of the vents 40, 42, 46 and 48 and generators 50, 52, 56 and 58. Intake vent 40 feeds or supplies air to generator 50. Similarly vent 42 supplies air to generator 52, vent 46 supplies air to generator 56 and vent 48 supplies air to generator 58. Exhaust air from generators 56 and 58 as well as bypass air from vents 46 and 48 exit through exhaust ducts 20 and 21 illustrated on the passenger side of the vehicle 10.

Vents 40 and 42 are mounted to one leg 62 of V-shaped shroud 64 and vents 46 and 48 are mounted to leg 66 of V-shaped shroud 64. Vents 40, 42, 46 and 48 are comprised of sections which may be opened to by-pass a portion of the air as will be described in greater detail hereinafter.

Also illustrated in FIG. 5 is a V-shaped shroud 70 having one leg 68 and another leg 72. V-shaped shroud 70 is also comprised of sections which may be opened to bypass a portion of the air being supplied to generators 74 and 76. For example, sections 69 and 71 are illustrated as being open on the driver side of the V-shaped shroud, and sections 73 and 75 are shown to be open on the passenger side or leg 72 of the V-shaped shroud 70. The structure of V-shaped shroud 70 and generator 74 and 76 are visible in FIG. 5 since the automobile is shown in dotted outline, but it is understood that this structure would be under the roof as illustrated in FIG. 1.

In a similar manner, a vent 78 is provided on the side of the vehicle with a plurality of sections 80 which are moveable or openable to selectively allow the bypass of a certain amount of the air being fed into generator 82.

Figure 6:
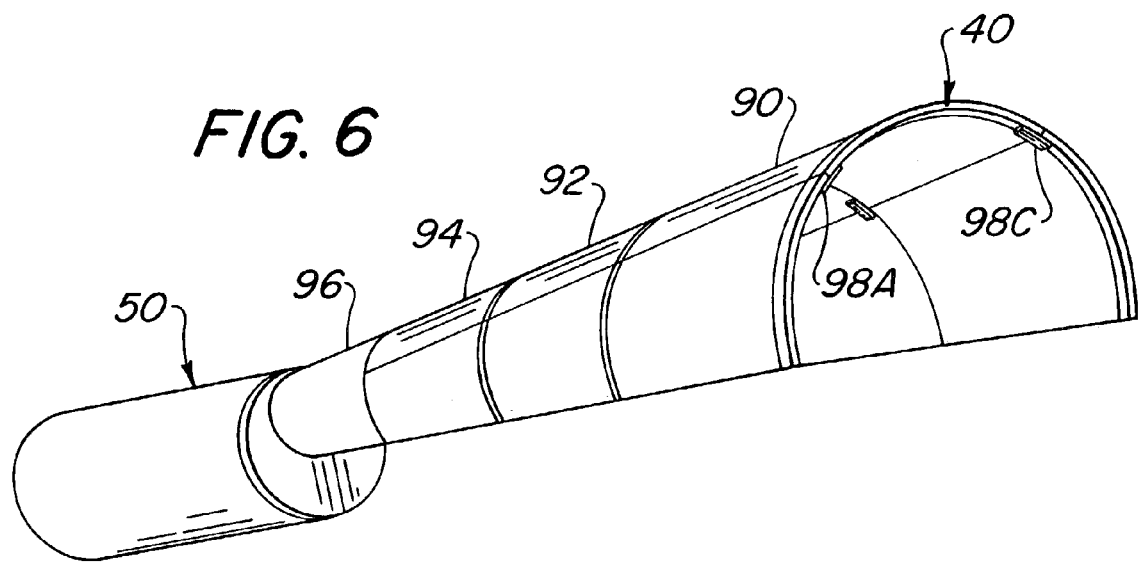
FIG. 6 is a view in perspective of an air vent and generator structure in accordance with the present invention with bypass structure closed.
Figure 7:
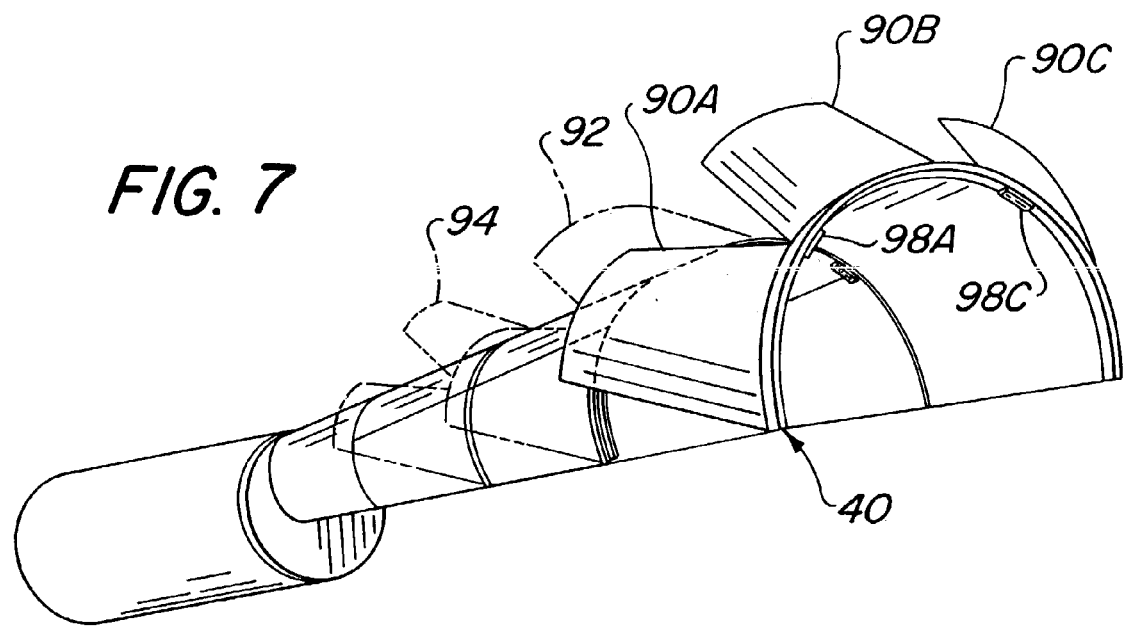
FIG. 7 is a view in perspective of an air vent and generator structure in accordance with the present invention with at least some of the bypass structure open.

Referring now to FIGS. 6 and 7, there is shown an enlarged view of vent 40 and generator 50. As illustrated in FIG. 6, vent 40 may be comprised of a plurality of sections. In a presently preferred embodiment, vent 40 would be comprised of sections 90, 92, 94 and 96. However, it is understood that any other suitable number of sections from 1 to any other suitable number may be utilized.

As illustrated in FIG. 7, the sections of vent 40 may be openable when the airflow is increased, generally as a result of the vehicle moving faster through air. As illustrated in FIG. 7, section 90 comprised of segments 90A, 90B and 90C may be opened as illustrated. These may be opened automatically by hinges, such as hinges 98A and 98C, as illustrated, for controllably opening segments 90A and 90C. Each segment would have a spring loaded hinge. The hinge would be calibrated to allow opening of the vent when the pressure on the segment reached a predetermined value. Each of the segments of Section 90, 92 and 94 would have their own precalibrated hinge. Alternatively, the segments of the vent sections 90, 92 and 94 may be computer controlled to provide selective opening depending upon air speed, pressure and other desired variables.

Referring now to FIGS. 8 through 11, there is shown in plan view, partially in cross section, vents 40 and 46 which feed generators 50 and 56 with the vents in various stages of bypass operation. For example, in FIG. 8, vents 40 is shown with all of its sections 90, 92, 94 and 96 closed providing maximum airflow in the direction of arrows 100 and 102 into generator 50. This would be at slow speeds of movement of vehicle 10 through air. At this speed, it would be desired to provide maximum airflow to the generator.

As the speed of the vehicle increases, there is a need to prevent drag on the vehicle by excessive airflow being captured in the vents. Accordingly, to reduce this drag effect, a predetermined amount of airflow should bypass the system. This bypass is effected in accordance with the present invention by the opening of vents or sections of the shroud. As illustrated in FIG. 9, vent 40 would have one section, section 90 opened. This is illustrated by the central segment 90B of section 90 being shown in the open position. Accordingly, some of the air is bypassed in the direction of arrow 104. In a similar manner, one of the sections of vent 46 would also be opened bypassing some of the air which would normally be directed through generator 56. As illustrated in each of the FIGS. 8 through 11, air that passed through the generator 50 is exhausted as shown by arrow 106.

As the speed of the vehicle 10 increased further, a second segment of the vents is opened to bypass more air. As illustrated in FIG. 10, sections 90 and 92 would be opened as illustrated by central segments 90B and 92B. Accordingly, a greater amount of airflow would be bypassed as shown by arrows 104 and 108.

As speed of vehicle 10 increases further, more sections of the vents would be opened. As illustrated in FIG. 11, vents for sections 90, 92 and 94 of vent 40 would be opened. This is illustrated in FIG. 11 by open segments 90B, 92B and 94B. Accordingly, air would be bypassed as shown by arrows 104, 108 and 110. As illustrated in FIG. 11, the same would apply for vent 46 which feeds generator 56.

Referring now to FIG. 12, there is shown a view in perspective of one embodiment of a generator in accordance with the present invention which provides efficient operation with minimum drag. The structure of generator 50 may be best understood by simultaneous reference to FIGS. 12, 14 and 15. Generator 50 illustrated in FIG. 12 is provided with a front mounting bracket 112 and a rear mounting bracket 114. The front and rear mounting brackets 112 and 114 are mounted to the body of the vehicle. Front mounting bracket 112 is provided with an air intake opening 116. A water tight seal or gasket 118 is provided between the mounting bracket and the body of generator 50. Mounting bracket 112 is also provided with a bearing housing structure 120. Bearing housing structure 120 is preferably provided with a watertight seal, however, any suitable bearing housing structure may be utilized.

Generator 50, as well as the other generators utilized in the vehicle which moves through air, is constructed such that the airflow directed through input 116 is directed at longitudinally directed spiral fins generally running in a longitudinal direction of a cylinder. The airflow causes the cylinder to rotate by impingement upon the longitudinally directed spiral fins with a minimum of drag on the vehicle. As illustrated in FIG. 12, at least one longitudinally directed spiral fin 122 is mounted on a rotatable cylindrical element. In a presently preferred embodiment, there are a plurality of longitudinally directed spiral fins, namely four fins 122, 124, 126 and 128. Any suitable number of fins may be utilized in practicing the present invention. For example, two, three, four, five, six or more fins may be utilized in a particular application. This may vary on the basis of various factors including the typical speed of the vehicle through air. For example, the number of fins may vary significantly between a relatively slow moving boat and a fast moving airplane.

As illustrated in FIG. 12, fins 122, 124, 126 and 128 make a quarter of a revolution about inner cylindrical member 130 as the fins travel the length of inner cylindrical member 130. It is understood that the fins may make any portion of a revolution about the inner cylindrical member, or a full revolution as described with respect to FIG. 17 or greater than revolution. The quarter revolution illustrated in FIG. 12 is by way of example only, and is not intended to be limiting. However, a partial revolution such as a quarter of a revolution may be a preferred embodiment of the invention where the rate of airflow is high and/or the torque requirements are low. Examples of such applications might include use in airplanes, high speed trains or automotive vehicles intended to be operated primarily at high rates of speed and/or where a thin lightweight coating of magnetic material is used and/or cylindrical component 134 is constructed of a lightweight material, such as plastic.

The fins are mounted on inner cylindrical member 130 between inner cylindrical member 130 and an outer cylindrical member 132. The space between adjacent spiral fins and between the inner and outer cylindrical members 130 and 132 may be considered to be a spiral vessel. As the vehicle moves through air, air is directed through the vents, such as vent 40, and into generator 50 via opening 116 in mounting bracket 112. This airflow causes the cylindrical component 134 comprised of the spiral fins and the inner cylindrical member 130 to rotate in FIGS. 12, 14 and 15. In a presently preferred embodiment illustrated in FIGS. 16 and 17, airflow causes the cylindrical component comprised of the spirals fins and the inner and outer cylindrical members 130 and 132A to rotate. In other words, the cylindrical component may be comprised of an inner cylindrical member with fins which rotates or may be comprised of a unitary unit comprised of spiral fins mounted between and connected to both the inner and outer cylindrical members wherein they rotate as a unit. This later embodiment will be described as a presently preferred embodiment in FIGS. 16 and 17 hereinafter. Although the outer cylindrical member may contain some mass, the overall rotational mass in the unitary embodiment of FIGS. 16 and 17 may be the same as the component inner cylinder, fins and outer cylinder may be thinner due to the additional rigidity provided by the composite unitary structure.

Figure 17:
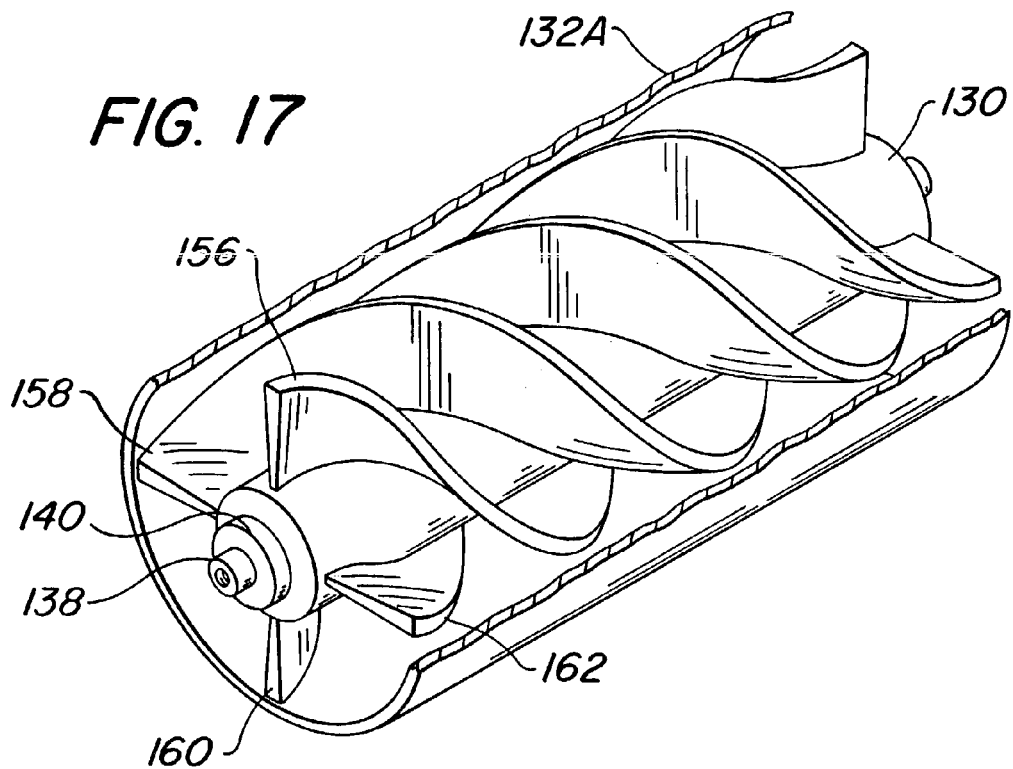
FIG. 17 is a view in perspective, partially broken away, illustrating one preferred embodiment of the spiral fins mounted to the inner and outer cylinder and making a complete revolution.

The cylindrical component 134 whether comprised of an inner cylindrical member 130 with fins which rotate within an outer stationary cylindrical member or whether comprised of a unitary unit of the inner cylindrical member, fins and outer cylindrical member as illustrated in FIG. 17, may be comprised of any suitable material including various metals and synthetic plastics. For example, cylindrical component 134 may be constructed of aluminum, iron, stainless steel, or various strong lightweight synthetic plastics including urethanes. The materials listed herein is not intended to be limiting, but any suitable material may be utilized in practicing the present invention, and the selection of suitable materials may be selected based on factors such as cost, weight of material, strength of material, rigidity, resistance to oxidation, durability and other factors. Any suitable material may be utilized in constructing the cylindrical components, the air vent structures and shrouds of the present invention, including all of the foregoing.

Various arrangements of magnetic and electrical components may be provided to generate electricity by this movement in various well known manners. The magnetic material may take various forms. The magnetic material may be permanent magnets or may be the magnetic coating material. This magnetic material may be preferably positioned on the inner surface of inner cylindrical member 130. This magnetic material may be provided on the entire length of inner cylinder 130 or it may be provided for less than the entire length, such as in one section or in one or more sections along the length of inner cylinder 130. Further, it may be provided in other locations on the cylindric cylinder as long as it creates a rotating magnetic field through the stationary armature. For example, the magnetic material could be located on the outer surface of inner cylinder 130, but, as previously indicated, it is preferably located as illustrated in the drawings on the inner surface of inner cylinder 130. The magnetic field can be created at any one point, several points or the entire length of the cylinder for maximum electrical output.

In a presently preferred embodiment, the inner cylindrical member 130 of cylindrical component 134 is provided with magnetic material, either permanent magnets or various other types of magnetic material, which causes a fluctuating magnetic field through a stationary armature 136 mounted on a stationary axle 138. As is well known, the armature may be comprised of electrical wire housed in a suitable structure of iron or other ferromagnetic material. The electricity generated in the armature by reason of the rotation of the magnetic field caused by the moving air impinging on the spiral fins may be used for various uses in the vehicle including operation of the vehicle and/or storage in batteries for future use.

Axle 138 and extension 140 of inner cylindrical member 130 are journaled in bearing 121 in housing 120. The rear end of axle 138 and extension 141 on the rear end of cylindrical member 130 are journaled in bearing 123 in bearing housing 113 of rear bracket 114. Bearing housing 113 of rear bracket 114 may preferably be a watertight sealed bearing, however, any suitable bearing housing may be utilized. The entire output of cylindrical component 134 is open for unobstructed airflow to be vented out of an exhaust vent such as exhaust vent 20. In this manner there is a minimum drag on the vehicle, even at high speeds.

Figure 14:
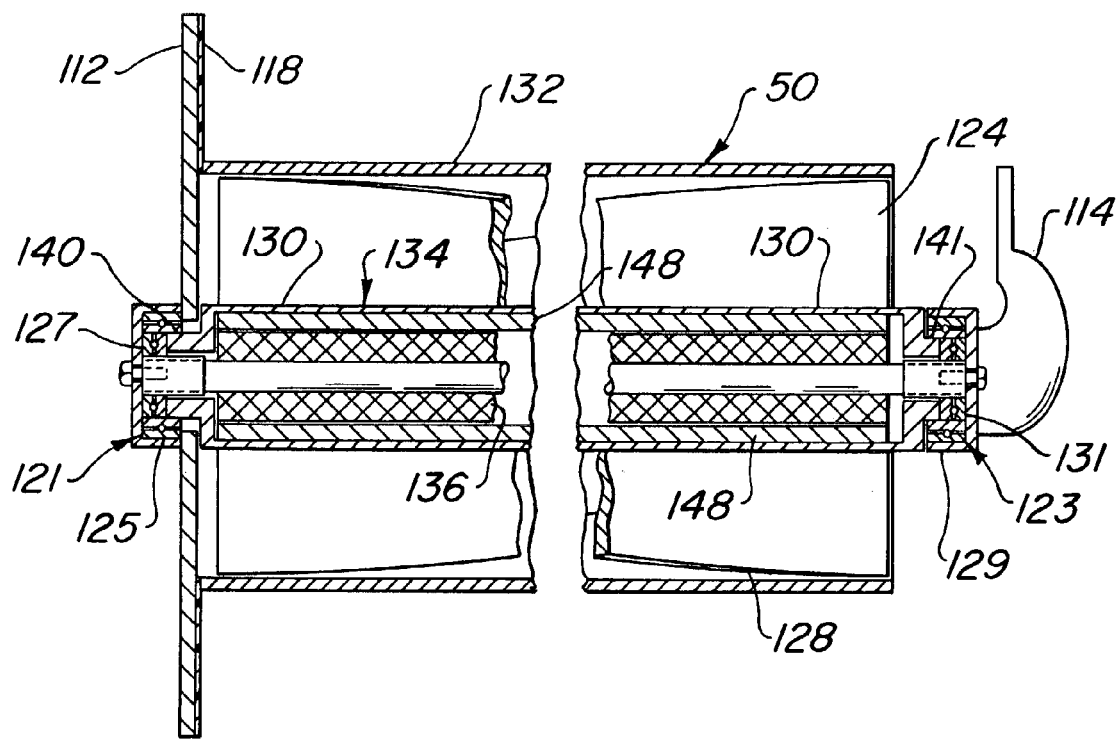
FIG. 14 is a cross sectional view, partially broken away, of the air driven generator structure of FIG. 12 taken along line 14—14.
Figure 15:
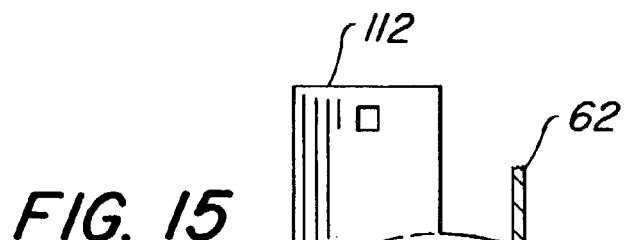
FIG. 15 is an elevation view, partially in cross section, of the input side of the air driven generator, including mounting bracket.

Referring further to FIG. 14, it may be seen that the bearings 121 and 123 are actually comprised of rotational bearings and thrust bearings. For example, bearing 121 has a rotational bearing 125 and a thrust bearing 127. Similarly, bearing 123 at the rear has a rotational bearing 129 and a thrust hearing 131. The extensions of reduced diameter 140 and 141 of inner cylindrical member 130 are journaled in these bearings. The reduction of the diameter of the extensions of inner cylinder 130 enables unobstructed airflow over the fins of the cylindrical component 134 as well as unobstructed exit flow.

Also illustrated in FIG. 14 is the magnetic material 148 mounted to the inner surface of inner cylinder 130. As described above, magnetic material 148 rotates with cylindrical component 134 about stationary armature 136 best illustrated in FIG. 14.

Figure 16:
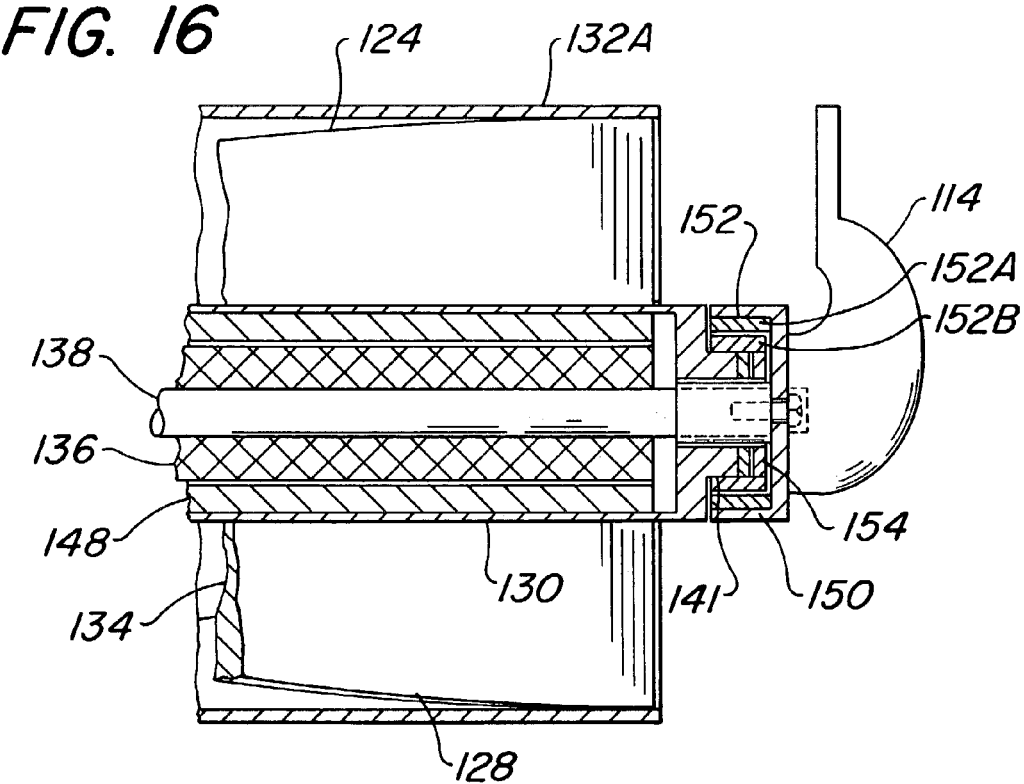
FIG. 16 is a cross sectional view, partially broken away, illustrating a portion of an air driven generator with spiral fins mounted to the inner and outer cylinder and including the use of magnetic bearings.

Referring now to FIG. 16, there is shown another embodiment of the present invention wherein magnetic bearings 150 are provided. Magnetic bearings 150 may be comprised of rotational bearing 152 and magnetic thrust bearing 154. As illustrated in FIG. 16, the magnetic bearings are comprised of two spaced apart repelling pieces of magnetic material. As illustrated with respect to rotation bearing 152, these are comprised of spaced apart magnetic materials 152A and 152B. These provide very low friction since parts are not in contact with each other. The remaining components of FIG. 16 are numbered similar to those in FIGS. 12-15. As may be seen in FIG. 16, the reduced diameter extension 141 of inner cylinder 130 is journaled in magnetic bearing 150.

As may be seen in FIG. 16, as well as the other figures, spiral fins 124 and 128 are mounted to inner cylindrical member 130 and outer cylindrical member 132A and rotate as a result of air impinging as the vehicle moves through the atmosphere. Fins may or may not be connected to outer cylindrical member but are preferably, as illustrated, connected to outer cylindrical member 132A to produce a unitary cylindrical component. The rotating unitary cylindrical component comprised of inner cylinder 130, the spiral fins and the outer cylinder 132A rotates carrying magnetic material 148 which causes a rotating magnetic field to cut through stationary armature 136 mounted on stationary axle 138. The magnetic material may be located on various portions of cylindrical component 134, including the outer surface of inner cylinder 130, but preferably as illustrated in the drawings, the magnetic material may be mounted as close to the armature as possible on the inner surface of inner cylinder 130.

Referring now to FIG. 17, there is shown a preferred embodiment of the present invention for high torque and/or low air speed applications wherein the spiral fins make one complete revolution around the inner cylinder. It is presently believed that this will tend to optimize performance at lower rates of airflow and/or where higher torque output is required from the cylindrical component. In FIG. 17, all components except for the spiral fins and outer cylindrical member 132A will be given the same numerals as utilized in the other embodiments. As shown in FIG. 17, spiral fins 156, 158, 160 and 162 make one complete revolution around inner cylinder 130 and are mounted to both inner cylinder 130 and outer cylinder 132A to rotate as a unit.

In accordance with the present invention, high output torque from the cylindrical component may be provided by fin configurations having a higher degree of rotation about the inner cylinder. In other words, as illustrated in FIG. 17 this could be one full revolution around the inner cylinder, or it may be greater than or somewhat less than one full revolution around the inner cylinder. As illustrated above, another preferred embodiment is illustrated in FIG. 12 wherein the spiral fins make less than a full revolution, and as illustrated in FIG. 12 make a quarter of a revolution as it traverses the length of the inner cylinder. An embodiment such as that illustrated in FIG. 12 where there is less than a complete revolution of the fin about the cylinders is presently preferred for applications involving a high rate of airflow. For example, use in high speed vehicles such as airplanes or faster moving land vehicles may be provided with optimal operating conditions where the fins make a partial revolution. Factors specific to each unique application will ultimately become the specific fin requirements. These factors include: the length of the chamber; the ratio between the inner and outer chamber diameters; the amount of magnetic material which needs to be rotated, and particularly the weight thereof; the amount and nature of the friction between the moving parts, including the types of bearings; the type of vehicle and its use; and the average minimum and maximum airflow velocities.

Within the spirit of the present invention, there may be variations in the structure of the spiral fins. As illustrated in FIG. 13, the surface of the spiral fin 146 may be provided with undulations 144. Other variations within the scope of the present invention regarding the fins include embodiments where the fin walls may progressively vary in thickness as they travel the length of cylindrical component 134 causing the spiral vessels to uniformly grow larger or smaller as they progress along the cylindrical component. Spiral walls may be a combination of smooth and undulated surfaces. The fins may also vary in the angle of interception between the inner and outer cylindrical walls 130 and 132. The fins may be calibrated to retract at specified speeds to vary size of the spiral vessels at different traveling speeds. All of the foregoing variations are intended to be covered within the scope of the appended claims.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. An apparatus for generating electricity, comprising:
   a vehicle;
   a generator for generating electricity mounted in said vehicle;
   said generator including a cylindrical component adapted to rotate, said cylindrical component including a plurality of spirally shaped vessels formed longitudinally in said cylindrical component;
   means for directing airflow at less than all of said spiral vessels as a result of movement of said vehicle through air;
   said means including structure for bypassing at least a portion of said airflow as said vehicle moves faster through air; and
   whereby said airflow causes said cylindrical member to rotate causing the generator to generate electricity.

2. An apparatus in accordance with claim 1 wherein a plurality of fins are mounted on an inner cylindrical member to form a plurality of spiral vessels in said cylindrical component.

3. An apparatus in accordance with claim 1 wherein said generator includes a centrally mounted stationary armature with said cylindrical component mounted to rotate about said armature.

4. An apparatus in accordance with claim 1 wherein said vehicle is a motor vehicle.

5. An apparatus in accordance with claim 1 wherein said vehicle is an automobile.

6. An apparatus in accordance with claim 1 wherein said vehicle is a train.

7. An apparatus in accordance with claim 1 wherein said vehicle is an airplane.

8. An apparatus in accordance with claim 1 wherein said vehicle is a water craft.

9. An apparatus in accordance with claim 1 wherein said means for directing airflow includes a shroud.

10. An apparatus in accordance with claim 9 wherein said shroud includes moveable sections for bypassing a portion of the airflow.

11. An apparatus in accordance with claim 10 wherein said moveable sections of such shroud are controlled in response to the speed of the vehicle through air.

12. An apparatus in accordance with claim 1 wherein said means for directing airflow includes a filter for preventing particulate matter from entering.

13. An apparatus in accordance with claim 1 wherein said means for directing airflow includes a beater for preventing icing in a cold environment laden with air moisture.

14. An apparatus in accordance with claim 1 wherein said vehicle has a generator and means for directing airflow mounted on each side of the front of the vehicle.

15. An apparatus in accordance with claim 1 wherein said vehicle has means for directing airflow and a generator mounted in the roof area of the vehicle.

16. An apparatus in accordance with claim 1 wherein said vehicle has means for directing airflow and a generator mounted in the side of the vehicle.

17. An apparatus in accordance with claim 1 wherein said structure for bypassing at least a portion of said airflow as said vehicle moves faster through air includes a shutter and wherein said shutter is provided with control for opening and closing said shutter as a function of speed of the vehicle and airflow therethrough whereby portions of the airflow may be bypassed.

18. An apparatus in accordance with claim 1 wherein said bypassed airflow exits said vehicle through an unobstructed pathway whereby the amount of drag is minimized.

19. An apparatus for generating electricity, comprising:
    a vehicle;
    a generator for generating electricity mounted in said vehicle;
    said generator including a cylindrical component adapted to rotate; said cylindrical component including a plurality of spirally shaped fins mounted longitudinally on said cylindrical component;
    said plurality of fins being mounted between an inner cylindrical element and an outer cylindrical member to form said cylindrical component;
    means for directing airflow in the direction of said plurality of spiral fins as a result of movement of said vehicle through air;
    said means including structure for bypassing at least a portion of said airflow as said vehicle moves faster through air; and
    whereby said airflow causes said cylindrical member to rotate causing the generator to generate electricity.

20. An apparatus in accordance with claim 19 wherein said plurality of fins is comprised of four fins.

21. An apparatus in accordance with claim 19 wherein the surface of said fin is smooth.

22. An apparatus in accordance with claim 19 wherein said fin is provided with undulations on its surface.

23. An apparatus in accordance with claim 19 wherein said means for directing airflow is a vent tapered from a larger input to a smaller output which provides output air to said at least one spirally shaped fin mounted on said cylindrical component.

24. An apparatus in accordance with claim 19 wherein said vehicle is a motor vehicle.

25. An apparatus in accordance with claim 19 wherein said vehicle is an automobile.

26. An apparatus in accordance with claim 19 wherein said vehicle is a train.

27. An apparatus in accordance with claim 19 wherein said vehicle is an airplane.

28. An apparatus in accordance with claim 19 wherein said vehicle is a water craft.

29. An apparatus in accordance with claim 19 wherein said vehicle has a generator and means for directing airflow mounted on each side of the front of the vehicle.

30. An apparatus in accordance with claim 19 wherein said vehicle has means for directing airflow and a generator mounted in the roof area of the vehicle.

31. An apparatus in accordance with claim 19 wherein said vehicle has means for directing airflow and generator mounted in the side of the vehicle.

32. An apparatus in accordance with claim 19 wherein said structure for bypassing at least a portion of said airflow includes a shutter and wherein said shutter is provided with control for opening and closing said shutter as a function of speed of the vehicle and airflow therethrough whereby portions of the airflow may be bypassed.

33. An apparatus in accordance with claim 19 wherein said bypassed airflow exits said vehicle through an unobstructed pathway whereby the amount of drag is minimized.

34. An apparatus in accordance with claim 19 wherein said means for directing airflow includes a shroud.

35. An apparatus in accordance with claim 34 wherein said shroud includes moveable sections for bypassing portions of the airflow.

36. An apparatus in accordance with claim 35 wherein said moveable sections of such shroud are controlled in response to the speed of the vehicle through air.

37. An apparatus in accordance with claim 19 wherein said means for directing airflow includes a filter for preventing particulate matter from entering.

38. An apparatus in accordance with claim 19 wherein said means for directing airflow includes a heater for preventing icing in a cold environment laden with air moisture.

39. An apparatus in accordance with claim 19 wherein said vehicle is provided with a slanted low air resistance windshield.

40. An apparatus for generating electricity, comprising:
a vehicle;
a generator for generating electricity mounted in said vehicle;
said generator including a cylindrical component adapted to rotate, said cylindrical component including a plurality of spirally shaped fins mounted longitudinally on said cylindrical component;
means for directing airflow in the direction of at least one spiral fin as a result of movement of said vehicle through air;
wherein the surface of said fin is smooth;
said means for directing airflow being a vent tapered from a larger input to a smaller output which provides output air to at least one spirally shaped fin mounted on said cylindrical component;
said means including structure for bypassing at least a portion of said airflow as said vehicle moves faster through air;
wherein said structure for bypassing at least a portion of said airflow includes a shutter; and
whereby said airflow causes said cylindrical member to rotate causing the generator to generate electricity.

41. An apparatus in accordance with claim 40 wherein said cylindrical component has four spiral fins mounted thereon.

42. An apparatus in accordance with claim 40 wherein said cylindrical component has magnetic material mounted on an inner surface of said cylindrical component such that a magnetic field is induced in said armature as said cylindrical component rotates.

43. An apparatus in accordance with claim 42 wherein said vehicle has a generator and means for directing airflow mounted on each side of the front of the vehicle.

44. An apparatus in accordance with claim 43 wherein said bypassed airflow exits said vehicle through an unobstructed pathway whereby the amount of drag is minimized.

45. An apparatus in accordance with claim 42 wherein said vehicle has means for directing airflow and a generator mounted in the roof area of the vehicle.

46. An apparatus in accordance with claim 42 wherein said vehicle has means for directing airflow and generator mounted in the side of the vehicle.

47. An apparatus in accordance with claim 42 wherein said automobile is provided with a slanted low air resistance windshield.

48. An apparatus in accordance with claim 40 wherein said shutter is provided with a control for opening and closing of said shutter as a function of speed of the vehicle and airflow through said vent whereby portions of the airflow may be bypassed.

49. An apparatus in accordance with claim 40 wherein said vehicle is a motor vehicle.

50. An apparatus in accordance with claim 40 wherein said vehicle is an automobile.

51. An apparatus in accordance with claim 40 wherein said vehicle is a train.

52. An apparatus in accordance with claim 40 wherein said vehicle is an airplane.

53. An apparatus in accordance with claim 40 wherein said vehicle is a water craft.

54. An apparatus in accordance with claim 40 wherein said vehicle has a generator and means for directing airflow mounted on each side of the front of the vehicle.

55. An apparatus in accordance with claim 40 wherein said vehicle has means for directing airflow and a generator mounted in the roof area of the vehicle.

56. An apparatus in accordance with claim 40 wherein said vehicle has means for directing airflow and generator mounted in the side of the vehicle.

57. An apparatus in accordance with claim 40 wherein said bypassed airflow exits said vehicle through an unobstructed pathway whereby the amount of drag is minimized.

58. An apparatus in accordance with claim 40 wherein said means for directing airflow includes a shroud.

59. An apparatus in accordance with claim 58 wherein said shroud includes moveable sections for bypassing a portion of the airflow.

60. An apparatus in accordance with claim 59 wherein said moveable sections of said shroud are controlled in response to the speed of the vehicle through air.

61. An apparatus in accordance with claim 40 wherein said means for directing airflow includes a filter for preventing particulate matter from entering.

62. An apparatus in accordance with claim 40 wherein said means for directing airflow includes a heater for preventing icing in a cold environment laden with air moisture.

63. An apparatus in accordance with claim 40 wherein said automobile is provided with a slanted low air resistance windshield.

* * * * *

UNITED STATES PATENT AND TRADEMARK OFFICE
CERTIFICATE OF CORRECTION

PATENT NO. : 6,857,492 B1
DATED : February 22, 2005
INVENTOR(S) : Liskey et al.

It is certified that error appears in the above-identified patent and that said Letters Patent is hereby corrected as shown below:

Column 10,
Line 5, delete "beater" and substitute therefor -- heater --.

Signed and Sealed this

Tenth Day of May, 2005

JON W. DUDAS
*Director of the United States Patent and Trademark Office*